United States Patent [19]

Bowsky

[11] Patent Number: 4,603,095
[45] Date of Patent: Jul. 29, 1986

[54] UNIVERSAL SEAL

[75] Inventor: Benjamin Bowsky, Maineville, Ohio

[73] Assignee: Emerson Electric Co., St. Louis, Mo.

[21] Appl. No.: 726,137

[22] Filed: Apr. 23, 1985

[51] Int. Cl.⁴ .............................................. H01M 2/06
[52] U.S. Cl. .................................... 429/181; 429/185;
174/50.61; 174/152 GM
[58] Field of Search ....................... 429/181, 184, 185;
174/50.61, 152 GM; 219/78.01, 117.1, 86.1,
91.2

[56] References Cited

U.S. PATENT DOCUMENTS

| | | | |
|---|---|---|---|
| 3,370,874 | 2/1968 | Scherer et al. | 174/50.61 |
| 4,292,346 | 9/1981 | Athearn | 429/181 |
| 4,358,514 | 11/1982 | Garoutte et al. | 429/181 |
| 4,379,961 | 4/1983 | Schmidt | 219/78.01 |

FOREIGN PATENT DOCUMENTS 0919831  4/1982  U.S.S.R. ............................ 219/78.01

Primary Examiner—Donald L. Walton
Attorney, Agent, or Firm—Polster, Polster and Lucchesi

[57] ABSTRACT

A universal seal particularly for use in a lithium battery having a metal end closure, the end closure having a web with parallel planar upper and lower web surfaces and a circular opening in the web, includes an annular eyelet having substantially parallel planar upper and lower surfaces and a central aperture with a terminal pin sealed in the aperture and projecting substantially perpendicularly to the planes of the surfaces. The eyelet has chamfered upper and lower perimetric edges, symmetrically positioned about a plane parallel to and equispaced from the upper and lower surfaces of the eyelet. The eyelet is of a diameter relative to the diameter of the web opening to permit a chamfered edge of the eyelet to engage a sharp arras of the web defining the margin of the web opening in substantially line contact, intermediate the width of the chamfered edge. The closure and eyelet are then joined by a weld between the closure and the eyelet around the meeting line.

7 Claims, 6 Drawing Figures

UNIVERSAL SEAL

BACKGROUND OF THE INVENTION

Conventionally, in making a glass seal in either a D or C sized lithium battery closures (lids), a terminal pin is sealed directly to the margin defining an opening in the closure of the battery. This is accomplished by putting an annular pellet or bead of glass or glass sinter around the terminal pin, placing the closure and pin with the bead around it in a fixture, along with, typically, about 71 other closures, putting the loaded fixture into a furnace or oven and raising the temperature to the melting point of the glass, to permit the glass to bond to the closure and the terminal. This method is slow and expensive. The closure surface has to be clean, the closures occupy a large amount of space, and the energy requirements are high because the closure is large and heavy as compared with the terminal pin and bead or pellet.

Eyelets have been used, in the form of sleeves with a flange extending radially outwardly from one end, and a weld projection formed on the underside of the flange. Terminals were sealed in the sleeve, and the sleeve welded to the battery closure along the weld projection. These eyelets have the advantage of dense loading for treatment in the fusing furnace, but they have two disadvantages. They are expensive and difficult to make, because the weld projection is difficult to form, particularly because all elements of the weld projection (ridge) throughout the 360° compass of the ridge have to lie in a common plane, and the eyelets have to be oriented in a unique direction in the fixturing and in the welding. It has been known, in reefer terminals, for example, to coin a sharp edge on a closure opening to serve as a weld projection, but that does not obviate the need for specific orientation of the terminal, which is in any event in a different environment, in which the characteristics of the materials used (their thicknesses, for example) are quite different from the environment in which the seal of this invention is used.

One of the objects of this invention is to provide a universal seal of the eyelet type which permits dense loading of fixtures, which can be oriented in either of two directions, both for fixturing and for welding, which is easy and cheap to manufacture compared with seals known heretofore, and which facilitates welding by providing a high resistance weld point at a substantially line contact around the entire periphery of the eyelet.

Other objects will become apparent to those skilled in the art in the light of the following description and accompanying drawing.

SUMMARY OF THE INVENTION

In accordance with this invention, generally stated, a universal seal for sealing a terminal pin in an opening is provided which comprises an annular eyelet having substantially parallel planar upper and lower surfaces, circular in plan, with a central aperture and a terminal pin sealed in the aperture and projecting substantially perpendicularly to the planes of the surfaces. The eyelet has chamfered upper and lower parametric edges, symmetrically positioned about a plane parallel to and equispaced from the upper and lower surfaces. The eyelet is of a diameter, relative to the margin defining a circular opening in a planar surface, such as to permit a chamfered edge to engage an arras of the margin in substantially line contact, intermediate the width of the chamfered edge.

The seal of this invention has particular utility as applied to a lithium battery with a metal end closure. The end closure has a web with substantially parallel planar upper and lower web surfaces and a circular opening in the web defined by a wall substantially perpendicular to the web surfaces and meeting at least one of the surfaces in a sharp arras, engaged by one of the chamfered edges of the eyelet. Because the chamfered surfaces are symmetrical about a central plane of the eyelet between the upper and lower surfaces of the eyelet, it does not matter, either in the fixturing of the eyelet in the course of the step of fusing the pin to the eyelet or in the welding of the eyelet to the cover or the like, whether the "upper" surface of the eyelet or its "lower" surface is uppermost.

The closure or the like into which the eyelet is to be welded is provided with a sharp arras between a planar surface and a surface defining the opening, which meets the chamfered surface of the eyelet in what is substantially a line contact, providing a high resistance weld point around the entire periphery of the eyelet.

DESCRIPTION OF THE PREFERRED EMBODIMENT

Figure 3A:
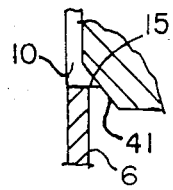
FIG. 3(a) is an enlarged fragmentary detailed view of the area indicated by the lines 3—3 of FIG. 2 before welding.

In the drawing, reference numeral 1 indicates a battery closure in the form of a lid with a web portion 2 and a rim 3. The web 2 has a planar outer surface 5 and a planar inner surface 6, substantially parallel to the outer surface 5. The closure 1 is circular in plan and has in its center a circular opening 10 defined by a surface 12 that intersects the outer and inner surfaces 5 and 6 perpendicularly to those surfaces in a sharp arras 15. If the opening 10 is punched cleanly, the arras 15 will be a right angled sharp line. However, in forming an opening in stainless steel, for example, the last part of the travel of the die by which the opening is formed is likely to produce not so much shearing as punching or tearing, and the operation produces a burr on the emerging side, as illustrated in FIG. 3(a). In any case, the opening 10 should be punched in the direction from the outer surface 5 through the inner surface 6. If a burr is formed, it constitutes the arras 15.

Figure 5:
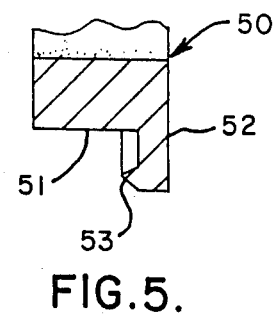
FIG. 5 is a fragmentary sectional view of a prior art eyelet.

Referring to FIG. 5, a prior art eyelet 50 is shown. The eyelet 50 is in the form of a sleeve with a barrel portion 51 with a radially outwardly extending flange 52 at one end. The flange 52 has formed on it a weld projection ridge 53 extending axially in the direction of the barrel. In this device, producing the flange and weld projection ridge is difficult and expensive, and the tolerances required are stringent. In the eyelet 50, a terminal pin is bonded in the inner opening of the barrel 51. The barrel 51 is put into the opening 10 in a lid, with the flange 52 overlying the outer surface of the lid and the eyelet is welded along the weld projection 53 to the lid. It can be seen that the eyelet 50 must be oriented in only one direction both in fixturing and welding to a lid.

Referring now to FIGS. 1 through 4 for one illustrative embodiment of universal seal of this invention, reference numeral 20 indicates an eyelet of this invention. The eyelet 20 has flat parallel surfaces 21 and 22, designated for convenience upper surface 21 and lower surface 22. The eyelet 20, which is circular in plan, has a central aperture 24 defined by a cylindrical wall 25, to which a terminal pin 30 is bonded by means of a glass seal 32. The outer margins of the eyelet 20 are defined by an outer wall 35, perpendicular to the parallel planar surfaces 21 and 22 and equidistant from them, a chamfered perimetric upper edge 41, and a chamfered lower perimetric edge 42. The angles of the chamfered edges 42 and 41 are identical, and the chamfers are symmetrical with respect to a plane parallel to and equidistant from sides 21 and 22, so that the eyelet is perfectly symmetrical with respect to that plane.

Figure 2:
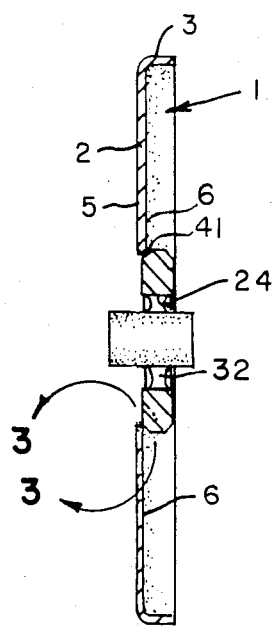
FIG. 2 is a sectional view taken along the line 2—2 of FIG. 1.
Figure 1:
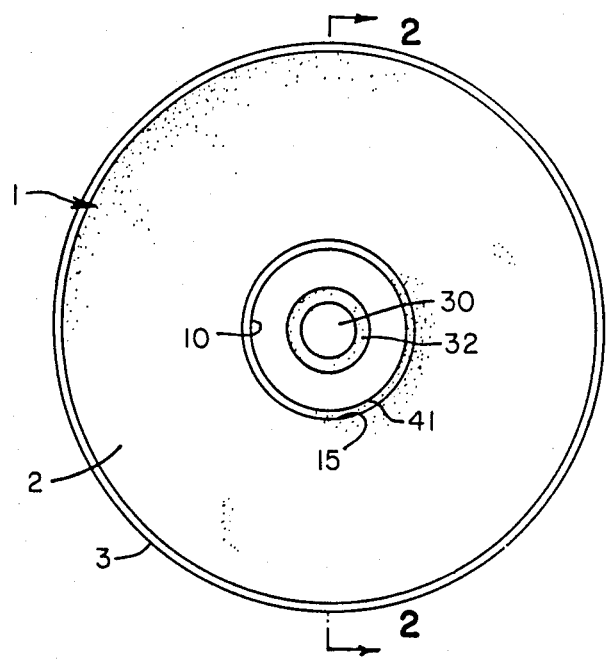
FIG. 1 is a top plan view of one embodiment of universal seal of this invention.
Figure 3B:
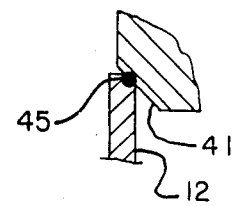
FIG. 3(b) is the fragmentary enlarged detail view shown in FIG. 3(a) after welding.

In the finished closure, as shown in FIGS. 1, 2 and 3, one of the chamfered edges 41 and 42 bears against the arras 15 of the web opening 10, forming a line contact between the chamfered edge and the arras 15. In FIG. 3(a), the arras is in the form of a burr. The eyelet is shown in place, from which it is urged downwardly by the pressure of an electrode, not here shown, on the upper surface 21. When welding current is applied, the burr-arras melts to form a weld nugget as shown in FIG. 3(b), the eyelet following the burr-arras as it melts, to be securely welded along its entire perimeter to the web. The provision of a burr is advantageous in the present invention, because it is an easy way to form a very thin section to provide a high resistance weld point, hence high local current density, to initiate the weld quickly and to permit its quick completion so as not to damage the glass seal. A clean shear will also provide such a line, but as has been pointed out, it is difficult to accomplish.

Merely by way of illustration, the eyelet can have an outside diameter of 0.300 inches and be 0.050 inches thick. The aperture 25 can be 0.50 inches in diameter. The chamfer angles of the edges 41 and 42 can be, and preferably are 45°, and the outer surface 35 can be 0.020 inches wide. The opening 10 in the closure can be 0.280 inches in diameter, and the web 2, 0.020 inches thick. The pin 30 can be 0.09 inches in diameter.

Figure 4:
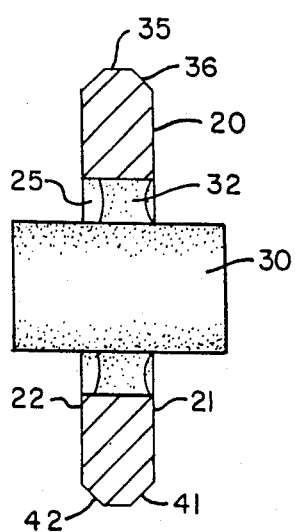
FIG. 4 is an enlarged sectional view of the eyelet of this embodiment, with a terminal pin sealed.

In forming the seals of this invention, the formed eyelets are placed in cavities in a fixture, with a flat side 21 or 22 up. A glass bead or pellet, with a central hole, is put in the opening 25, and pins 30 are inserted in the pellets and positioned to project an equal distance from either side of the eyelet. Instead of approximately 72 lids per square foot, approximately 1400 eyelets can be accomodated per square foot of fixture. The loaded fixture is put into an oven or furnace and the glass bead or pellet fused to the wall 25 of the opening 24 and to the terminal pin 30, as shown in FIG. 4. It is not important that the bead be centered axially in the opening 24, because the pin 30 is positioned by the fixture symmetrically with respect to the central plane of the eyelet. It can be seen that in loading the fixture, the eyelets can simply be distributed without regard to which of the sides 21 and 22 is uppermost.

Similarly, when the eyelets 20 are to be welded to closures 1, they need only be centered in the openings 10, on the side from which the die forming the opening emerged, because the eyelets being perfectly symmetrical, it makes no difference which of the chamfered edges 41 and 42 engages the arras 15. The line contact between the chamfered edge and the arras 15 provides a high resistance weld point, which starts the weld easily and effectively, and at present the eyelets can be welded to the lid at a rate of one a second and without damaging the glass weld.

It can be seen that the size of the lid or closure for the battery is immaterial as long as the opening in the lid is sized to permit the eyelet to be welded into it as has been described. Similarly, the diameter of the terminal pin can be varied, within limits, for example, 0.02 to 0.09 inches, without changing the dimensions or construction of the eyelet. Of course, the dimensions of the eyelet itself can be changed. The chamfer angles can be changed also, although the 45° chamfer is believed to be the optimum angle. The closure 1, eyelet 20 and terminal pin 30 are preferably made of stainless steel, but other metals can be employed. The seal 32 is preferably of glass, but other sealing material can be used. Although it is convenient and preferable to have the pin 30 project symmetrically with respect to the central plane, it can be seen that it is not essential, the length of the pin and the degree of its projection from one side or the other being a matter of choice. Numerous other variations in the construction of the seal of this invention within the scope of the appended claims will occur to those skilled in the art in the light of the foregoing disclosure.

I claim:

1. A lithium battery having a metal end closure, said end closure having a web with substantially parallel planar upper and lower web surfaces and a circular opening in said web defined by a wall substantially perpendicular to the said web surfaces and meeting at least one of said surfaces in a sharp arras, and a seal comprising an annular eyelet, having substantially parallel planar upper and lower surfaces circular in plan, with a central aperture and a terminal pin sealed in said aperture and projecting substantially perpendicularly to the planes of said surfaces, and chamfered upper and lower perimetric edges, symmetrically positioned about a plane parallel to and equispaced from said upper and lower surfaces, said eyelet being of a diameter relative to the diameter of said web opening to permit a chamfered edge of said eyelet to engage a said sharp arras of said web in substantially line contact, intermediate the width of said chamfered edge.

2. The seal of claim 1 including a weld between said closure and said eyelet around said meeting line.

3. The seal of claim 1 wherein said terminal pin is positioned to project symmetrically with respect to said plane.

4. The battery of claim 1 wherein said sharp arras is in the form of a thin burr extending in a direction toward said chamfered edge.

5. In combination with a closure having a planar surface with an opening in it, said opening being defined by a cylindrical surface perpendicular to said closure planar surface and having a sharp arras around said opening, a terminal pin sealed in said opening, the improvement wherein said seal is a universal seal comprising an annular eyelet having substantially parallel planar upper and lower surfaces, circular in plan, with a central aperture and a terminal pin sealed in said aperture and projecting substantially perpendicularly to the planes of said eyelet surfaces, and chamfered upper and lower perimetric edges, said edges being symmetrically positioned about a plane parallel to an equispaced from said upper and lower surfaces, said eyelet being of a diameter relative to the diameter of said closure opening such as to permit a chamfered edge to engage said arras in substantially line contact, substantially intermediate the width of said chamfered edge.

6. The seal of claim 5 wherein the angle of said chamfered upper and lower perimetric edges to the planes of their respective upper and lower surfaces is 45°, and a central, outer perimetric edge surface perpendicular to said planar upper and lower surfaces extends between outer margins of said chamfered edges.

7. The combination of claim 5 wherein said sharp arras is in the form of a thin burr extending in a direction toward said chamfered edge.

* * * * *